May 1, 1928. Re. 16,955

E. B. THURSTON

ELEVATOR OPERATION DEVICE

Original Filed Nov. 13, 1922 4 Sheets-Sheet 1

Inventor

Ernest B. Thurston

By Owen & Owen

Attorneys

May 1, 1928. Re. 16,955

E. B. THURSTON

ELEVATOR OPERATION DEVICE

Original Filed Nov. 13, 1922 4 Sheets-Sheet 2

Inventor

Ernest B. Thurston

By Owen & Owen

Attorneys

May 1, 1928. Re. 16,955

E. B. THURSTON

ELEVATOR OPERATION DEVICE

Original Filed Nov. 13, 1922 4 Sheets-Sheet 3

Inventor

Ernest B. Thurston

By Owen & Owen

Attorneys

May 1, 1928. Re. 16,955

E. B. THURSTON

ELEVATOR OPERATION DEVICE

Original Filed Nov. 13, 1922 4 Sheets-Sheet 4

Inventor

Ernest B. Thurston

By Owen & Owen

Attorneys

Reissued May 1, 1928. Re. 16,955

UNITED STATES PATENT OFFICE.

ERNEST B. THURSTON, OF TOLEDO, OHIO, ASSIGNOR TO THE HAUGHTON ELEVATOR & MACHINE CO., OF TOLEDO, OHIO, A CORPORATION OF OHIO.

ELEVATOR-OPERATION DEVICE.

Original No. 1,553,204, dated September 8, 1925, Serial No. 600,542, filed November 13, 1922. Application for r issue filed August 27, 1927. Serial No. 215,962.

This invention relates to the control and operation of electric elevators. It has utility when incorporated in an elevator installation having a dual system of control, so that it may be operated either as an automatic system or as an operator-controlled system. Special provision is made in connection with both systems of control for automatically bringing the car to a stop in such a manner that it will register accurately with any floor which may have been selected. The invention, in its present embodiment, is shown as operated by a three-phase alternating electric current, but it is obvious that the invention is not limited to such installation.

Referring to the drawings.

Figure 1:
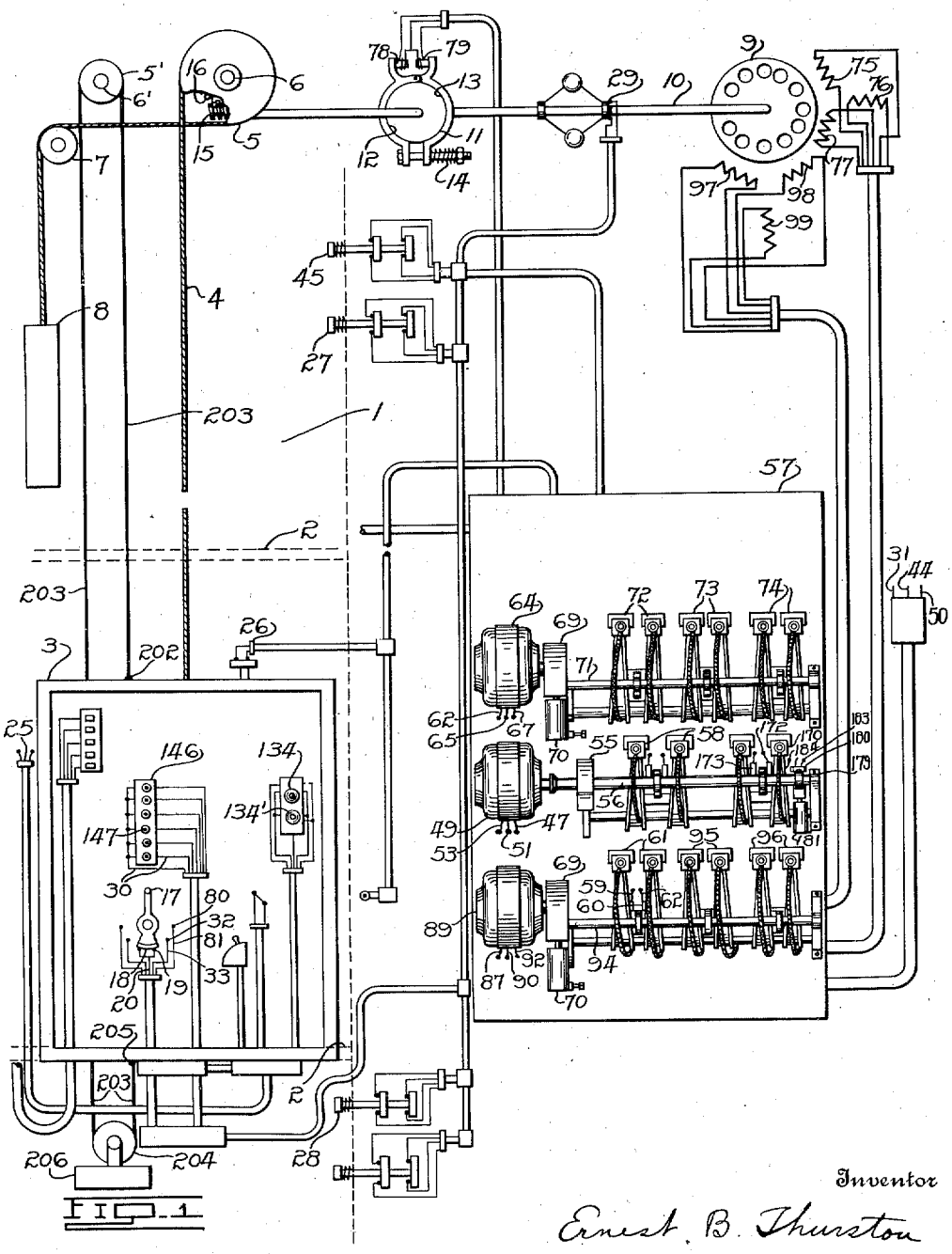
Figure 1 is a view, with parts broken away, illustrating the invention in connection with a three-phase alternating current system.

In elevator shaft 1 are landings 2 past which may travel elevator car 3 as actuated by hoisting line 4 passing upward from the car 3 about hoisting drum 5 on shaft 6. The hoisting line 4, after passing about the hoisting drum 5 extends about idler 7 to counterweight 8. Motor 9 is shown as provided with shaft 10 upon which is fixed brake drum 11, normally engaged by brake shoes 12, 13, held in position thereagainst by spring 14. This held shaft 10 through worm 15 thereon in mesh with worm wheel 16 fixed with the shaft 6 and the drum 5, serves to hold the car 3 in the elevator shaft or well 1 against travel. Upon release of the shaft 10 and driving operation of the drum 5 therefrom, travel of the car 3 is effected.

For manual or operator handling of the car 3, there is provided a controller 17 in the car 3. This controller has contact 18 which in central position engages terminal 19 from which extends line 20 to terminal 21 at throw over control switch 22. The term throw over control is used herein to denote control means for changing over from the automatic system to the operator handling system or vice versa. The position of this switch 22 as taken herein for operator handling of the car 3, is that the terminal 21 has contact with terminal 23. From this terminal 23 extends line 24 through gate switch 25 on the car 3, through landing door interlock switches 26, upper over travel switch 27, lower over travel switch 28, governor switch 29, as a series of safety devices, thence by way of line 30 through car push button normally closed to power supply line 31.

In the handling of the controller 17, say for up direction travel of the car 3 in the elevator well or shaft 1, this controller 17 is shifted to bring its contact 18 to terminal 32. From this terminal 32 extends line 33 by way of coil 34 at switch 35, thence by line 36 through switch 37 to line 38 extending to interlock at down direction relay 39. With such down relay 39 closed, the line 38 is connected to line 40 extending to energize coil 41 of up direction relay 42. From this coil 41 extends line 43 through safety device switches 25, 28, 29 to second power supply line 44. This closing of the up direction relay 42 effects operation of direction and low speed switches.

The power line 44 extends through upper stop limit switch 45, and thence by line 46 to the relay 42, and therefrom by line 47 to winding 48 of direction switch motor 49. Third power supply line 50 extends to the relay 42, and thence by way of line 51 to winding 52 of the switch motor 49. From the line 20, connected through the switch 23, line 24, and devices 25, 26, 27, 28, 29, 30, with the power line 31, is branch 53 to third winding 54 of the motor 49. The three windings of this three-phase alternating current torque motor 49 are thus energized, and effective through coupling 55 to rock shaft 56 carried by control board or panel 57. Up direction power switch 58 is accordingly closed through the operation of this shaft 56.

From the line 20 extends branch 59 through interlock 60 as actuated by shaft 94 for high speed switch 61. With this high speed main switch 61 closed, the line 59 is connected by line 62 to winding 63 of main low speed switch torque motor 64, carried by the panel 57. The line 47 has branch 65 to winding 66 of the torque motor 64, while the line 51 has branch 67 to winding 68. Accordingly, as the relay 42 has closed to energize the direction motor 49, there is a simultaneous energizing of low speed main switch motor 64, effective through two to one speed reduction gearing 69, and as retarded by dashpot 70, to rotate shaft 71 for first closing main low speed switch 72, to be followed by low speed acceleration switches 73, 74, cutting out acceleration resistances in low speed windings 75, 76, 77, of the actuating motor 9 for the hoisting drum 5. As shown, these resistances are in a drawn out junction of the Y-type of three-phase windings, and one switch arm bridges between two lines to cut out resistances in two phases and the second arm of the two arm switch bridges to cut out the third resistance and connect to the other arm to thereby form the junction in a balanced cutting out of these resistances. The closing of the direction switch 58 serves to energize brake coils 78, 79, thereby moving the brake shoes 12, 13, clear of the brake drum 11, so that the motor 9 is free for rotating the shaft 10, and through the worm 15 and the worm wheel 16, driving the drum 5 for causing the hoisting line 4 to move the car 3 upwardly in the shaft 1, at low speed travel rate.

For increasing the upward travel rate of the elevator car 3, the controller 17 is shifted to have the contact 18 engage terminal 80 from which extends line 81 to terminal 82 at the throw over switch 22. As this throw over switch 22 is in position for operator handling of the car 3, the terminal 82 is connected with terminal 83 from which extends line 84 to the switch 35. This switch 35 was energized for closing when the controller 17 was on the terminal 32. Accordingly the line 84 is connected to line 85 through upper floor slow down switch 86, at a control device or drum mechanism near the upper floor stop switch 37. From this switch 86 extends line 87 to winding 88 of high speed switch torque motor 89. From the line 47 extends branch 90 to winding 91, and from the branch 51 extends branch 92 to winding 93. The three windings 88, 91, 93, of the high speed torque motor 89 are now energized. This high speed switch operating motor 89 is mounted on the panel 57 and through speed reduction gearing 69, and as retarded by dashpot 70, may rotate shaft 94 to close high speed switch 61, and simultaneously open the interlock 60, cutting out the low speed switch motor 64, so that the weight at the dashpot 70 may draw the shaft 71 into position for opening the switches 74, 73, 72, thereby deenergizing low speed windings 75, 76, 77, of the motor 9. Simultaneously with this deenergizing of the low speed windings of the motor 9, the high speed main switch 61 in closing has been followed by high speed acceleration switches 95, 96, which in sequence first energize the high speed windings 97, 98, 99, and then in steps cut out resistances with maintenance of load balance between the windings, as the resistances are in the brought out junction of the star windings. Each switch is shown as comprising two arms. One arm bridges between two lines to cut out two resistances, and the other arm connects with said bridge to cut out the third resistance to provide the junction. The car 3 is now ascending in the well 1 at high speed.

In the event the operator does not act to throw the controller 17 to a central position for an intermediate landing stop in the well 1, the car 3 is automatically brought to a stop at the top floor or landing 2. To this end landing control stops are connected for control operation from a driven drum 5′. The driven drum 5′ is secured to a shaft 6′ mounted in bearings 100. Fast on one end of the shaft 6′, which protrudes beyond one of the bearings 100, is a two-armed rotary bracket or spider 101 (Fig. 3) which constitutes a driving carrier for rotating guide rods 102. This pair of rods 102 extends to a second bracket or spider 103, loosely mounted on a shaft 104 fixed against rotation by being mounted in a bracket 105 uprising from the base 106 which carries the drum bearings 100. This non-rotary shaft 104 is held centered as to the rods 102, by extending into a socket 107 of the spider 101. Between the spiders 101 and 103, the shaft 104 has a threaded portion 108. Mounted on this threaded portion 108 of the non-rotary shaft 104, is a nut 109 having arms 110 through which the rods 102 extend. Accordingly as the rods 102 revolve about the shaft 104 as they are driven from the drum shaft 6′, the nut 109 is rotated clockwise for one direction of elevator travel and counter-clockwise for the reverse direction of elevator travel. This nut 109 accordingly has an angular shifting with the driven drum 5′. The number of pitches of the threaded portion 108 are in excess of the number of rotations of the drum 5′ for the full travel distance for the elevator car 3. The range of travel of the nut 109 is thus within the extent of the threaded portion 108.

Figure 2:
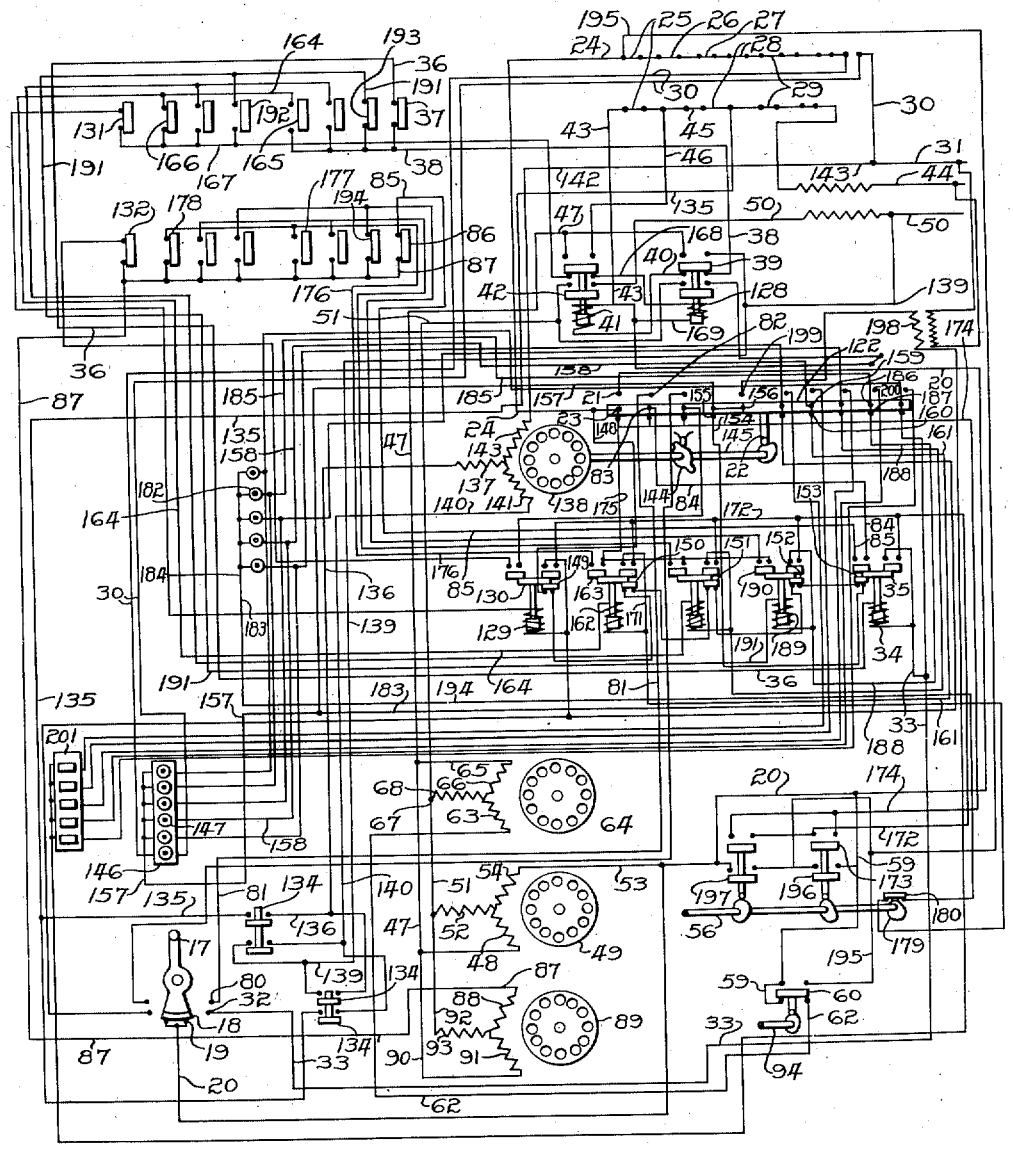
Fig. 2 is a wiring diagram of features of control of the installation of Fig. 1 independently of the power circuit.
Figure 5:
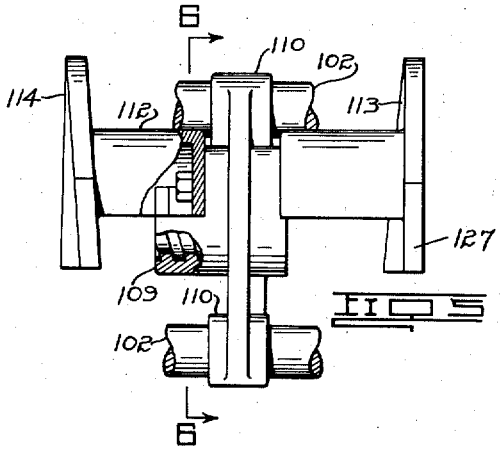
Fig. 5 is a side elevation, with parts broken away, of a skeleton control drum or cam for automatic floor finding operation of an elevator car in conjunction with operator control in travel toward such floor or landing.
Figure 6:
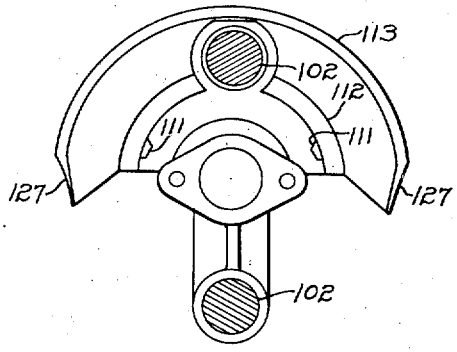
Fig. 6 is a section on the line 6—6, Fig. 5.

For effecting automatic control, the traveling nut 109 may have a control member suitably secured thereto, as for example by bolts 111. For effecting floor finding in connection with operator control, or for automatic stopping at terminal landings, this control member may be in the form of a skeleton drum 112, as shown in Figs. 5 and 6. This drum is shown as provided with down switch coacting flange or cam 113 at one end and up switch coacting flange or cam 114 at the other end. The base 106 is provided with upstanding brackets 115 carrying toward the bracket 105, one series of mounting rings 116, and disposed oppositely thereto and extending toward the bearings 100, a second series of mounting rings 117. These rings 116, 117, are coaxial with the shaft 104 and surround the travel region of the rods 102. The upper floor slow down switch 86 and the upper floor stop switch 37 (indicated in Fig. 2) are mounted on the ring 116 adjacent the bracket 105. Each switch is mounted by means of a hook plate 118 adjustably clamped by a wedge head bolt 119 as drawn up by nut 120 into firmly anchoring position at such point as may be desired on the ring 116. The line terminals are brought in to arm 121 carried by the plate 118. Pivot pin 122, carried by the plate 118 rockably mounts switch closing arm member 123, which is normally held in closed position by compression helical spring 124, coacting between the plate 118 and arm 125. This lever arm 125 carries roller 126 which, in the closed position of the switch, extends radially inward to be in the range of control member travel. The control cams 113, 114, are shown of an extent approximating 180° and are of the pitch of the threaded portion 108, thereby limiting registry of the roller 126 therewith to a selected pitch arc. The lineal travel rate of the up direction switch controlling cam 114, as determined by the rotation of the drum 5′, while not identical with the travel rate of the car 3, may approximate such travel rate. As herein shown, the drum 5′ is driven by a line 203, which is positively tied thereto, so that the controlling cam is directly connected up against lost motion disturbances, and its travel rate is therefore directly proportional to that of the car, and the stopping of the latter will be controlled with great accuracy, as will be hereinafter more fully explained.

Adjustable mounting of the switch 86 on the ring 116 may be such that the slow down switch 86 is first opened. This means, that notwithstanding the operator has failed to shift the controller 17 off the terminal 80, the counterweight action of the piston in the dashpot 70 at the high speed torque motor 89 has automatically opened the switches 96, 95, 61, with resultant automatic cutting in of the low speed switch torque motor 64 due to the action of the interlock 60. This position for the automatic action of the slow down switch to throw the driving of the car 3 from high speed travel rate to low speed travel rate may occur at such distance short of the top landing 2 as is found most acceptable in practice, depending on the speed of the car and load. As an instance, this opening of the high speed switch 61 may occur eighteen inches below the top floor 2. The continued travel of the car 3 at low speed is controlled by the drum 5′, and while the roller 126 has ridden up on terminal incline 127 of one end of the cam 114 to open the switch 86, the continued travel of the cam effects lifting of a roller 126 to open the switch 37 as the car 3 reaches the top landing 2, thereby automatically stopping the car in proper registering position with such landing. The ready angular adjustment of the plates 118 on the rings 116, permits simple determination of the proper placing of these automatic switches. The car 3 is thus stopped automatically, notwithstanding the operator has not thrown the controller 17 to central or off position.

Figure 3:
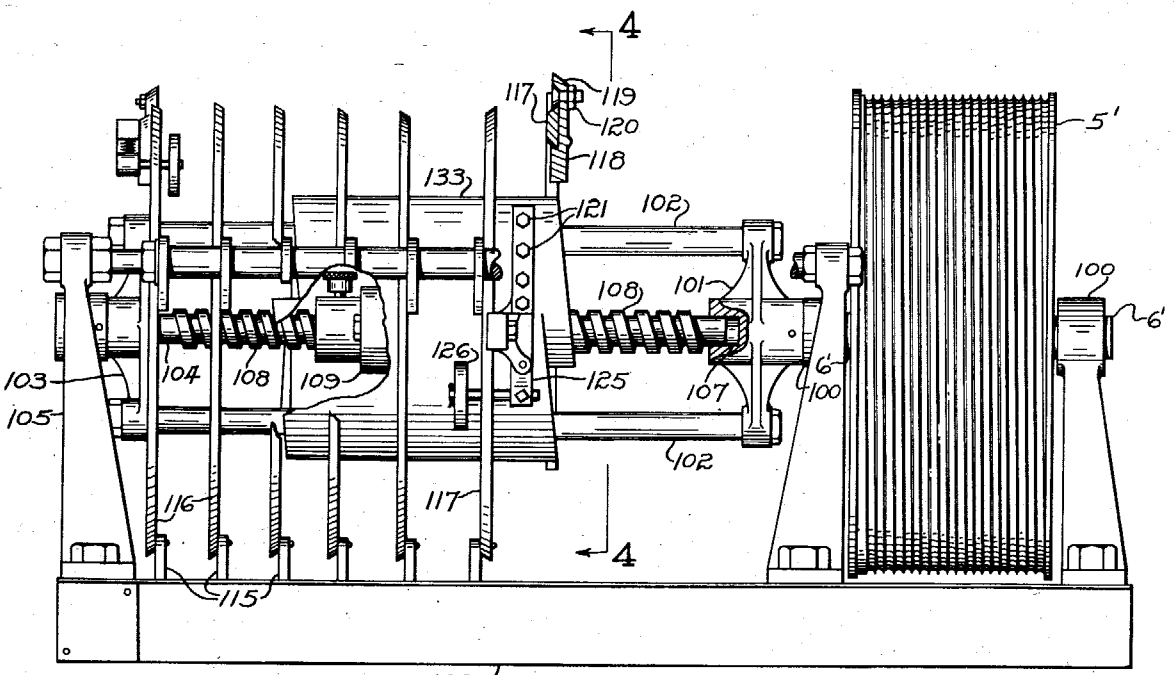
Fig. 3 is a side elevation of the control driving drum, with the control drum associated therewith, parts being broken away.
Figure 4:
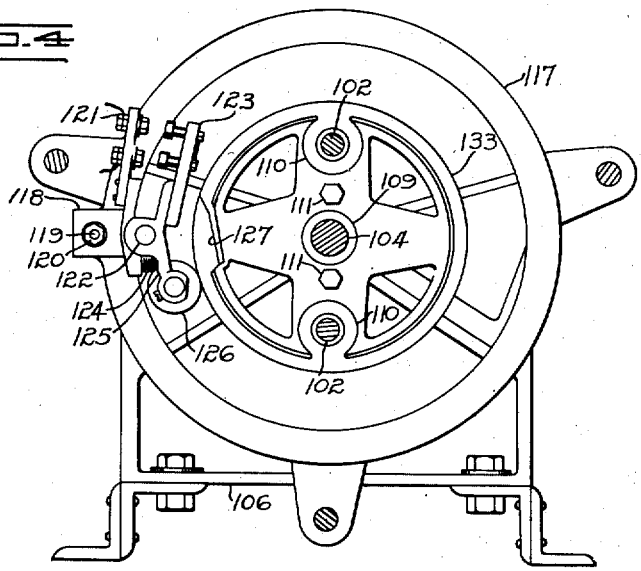
Fig. 4 is a section on the line 4—4, Fig. 3.

To effect movement of the car 3 downward away from the top landing 2, it is only necessary to throw the controller 17 reversely from the throw given for up direction travel, i. e., to the right in Fig. 1, which will be effective through down direction relay coil 128 at the down direction relay 39, and will energize landing or floor terminal selection solenoid 129 for the first or lowermost floor in the well 1, to close switch 130. This series of connections and control is similar to that for the up direction as heretofore described with reference to up direction relay coil 41 and up direction relay 42. The control lines will extend through lower landing stop switch 131, as well as slow down switch 132 for said lowermost landing. The car 3 if not stopped at an intermediate position, will automatically come to a stop at the bottom floor, even with the controller 17 in downward on position. The sequence of this automatic operation is determined by the control drum cam 113 acting first to open the slow down switch 132 and then the stop switch 131. This mode of automatic stopping terminally of the shaft 1 may occur with control drum 133 continuous between the cams 113, 114, as shown in Figs. 3 and 4. As so far described, a single ring 116 as a mounting for switches to effect upper limit stopping, and a single ring 117 for switches to effect lower limit stopping, are sufficient.

In the automatic or push button control, the continuous drum 133 is used, as well as rings 116 for mounting switches for every floor but the lowermost, and rings 117 for mounting down switches for every floor but the uppermost. Conversion of this installation from manual or operator control to one of the automatic or push button type is effected simply by the operation of the switch 134′, located in the car 3. Furthermore, reversal or changing back to manual from push button, may as simply be effected by the operation of the switch 134 also located in the car 3.

From the line 44, between the switches 28, 45, extends line 135 to the switches 134, 134′ in the car 3. The line 135 is connected by this switch 134 to line 136 extending to winding 137 of torque motor 138. From the power supply line 50 extends branch 139 past this normally open switch 134 by way of line 140 to winding 141 at the motor 138. From the power supply line 31, there is branch line 142 to winding 143. As the three windings of this torque motor 138 are energized, the motor gives a pull to a stop to turn shaft 145, thereby shifting the throw over switch 22 from the manual or operator controlled position, to the automatic or push button control. For re-operation the switch 134′ brings about a reverse turn for the shaft 145, which would place the switch 22 in the original position for operator operation.

The installation will now be considered with the throw over switch thrown for push button control.

Assuming the car 3 is at the third floor landing, then the down stop switches for the floors therebelow are closed, and the up stop switches for the floors thereabove are also closed. The remaining or intermediate stop switches, both up and down, are held open by the drum 133. Similar conditions for open and closed slow down switches prevail at this same position of the car 3.

The passenger in the car 3 may, after the doors or gates are closed, select a floor, as the second for example—the one below that at which the car is assumed to be. To this end, in the bank of push buttons in panel 146 in the car 3, push button 147 is depressed. The circuits for the push button are now to be traced.

The power supply line 31, in normal operation, is connected through the several safety devices and line 24, from which extends branch 148, through normally closed interlocks 149, 150, 151, 152, 153, one at each relay for each floor or landing stop, from the switch 35 as the top landing relay to and including the switch 130 as the bottom landing relay switch. From the interlock 153 extends line 154 to terminal 155 at the throw over switch 22. This terminal 155 is closed with terminal 156, from which extends line 157 to the push button 147 which has just been depressed. As this push button 147 is depressed, the line 157 is connected by way of line 158 to terminal 159 which at this position of the throw over switch 22 is closed with terminal 160, having line 161 extending to coil 162 at second floor relay switch 163. From this relay coil 162, line 164 extends to up stop switch 165, which is open. However, this line 164 also extends to down stop switch 166, which as heretofore discussed, is a stop switch below the car 3 and is closed. Therefore, there is connection from the line 164, past this switch 166 to line 167 through the closed interlock of open up direction switch 42, thence by line 168 to down direction relay coil 128, connected by the line 169 with the line 43 through the safety devices to the power supply line 44.

It is to be noted that energizing of the landing relay coil 162, closes this switch 163 and opens the interlock 150. The throwing of the down direction relay 39 effects operation of the direction switch torque motor 49 for closing down direction switch 170. As the switch 163 is thrown to closed position and thus cuts out or opens the interlock 150, there is a by-pass by line 171 for maintaining the coil 162 energized. This line 171 is connected by the closed switch 163 and line 172 to interlock 173 as closed by the down direction switch 170, and thence by line 174 to the throw over switch 22, where it is there connected to the line 24. Even though the button 147 be depressed for but a short interval, there results this automatic by-passing not only of the interlock 150, but also of the push button 147, with the operation not only of the direction switch torque motor 49, but also of the high speed main switch 61, with its acceleration resistance cutting out switches 95, 96, to closed position by the motor 89. The relay 162 effects this starting of the car 3 downward on high speed, for the line 24 at the throw over switch 22, is connected with line 175 to the relay switch 163, and through this closed switch by way of line 176 with no effect at open slow down switch 177, but effective through closed slow down switch 178 and the line 87 to complete the third line to the motor 89—the lines 90 and 92 having been connected in by the down direction relay 39. This approximately simultaneous action of the high speed main switch motor with the direction switch motor, opens the interlock 60 to preclude any operation whatsoever of the low speed switch torque motor 64.

The car 3 is now traveling downward at high speed from the third landing toward the second. As the car 3 reaches, say, within about 18 inches of the second landing 2, the roller 126 of the switch 178 rides up the terminal incline 127 of the down direction cam end 113 of the drum 133, to open the slow down switch 178, thus automatically cutting out the high speed switch motor 89, for opening the high speed winding switches, and simultaneously through the interlock 60 completing the circuits for energizing the low speed switch torque motor 64, thereby actuating the car 3 toward the second landing at low speed. As this landing is reached, the roller 126 at the switch 166 rides up the terminal incline 127 of the down direction cam end 113 of the control drum 133 and opens the stop switch 166 as the car 3 registers with such landing. The passenger in leaving the car 3, opens the landing doors or car gates, and through the safety devices, thereby holds the car 3 against anyone at another landing taking such car.

At the direction switch shaft 56 there is cam 179 which in switch closing rotation of the shaft 56 for either direction, effects opening of normally closed switch 180 in the line 183. This switch is retarded in closing by dashpot 181, thereby providing a time lag against one at a landing taking the car from a passenger, if the passenger acts promptly for opening the car door as soon as the car 3 reaches the landing to which the car has traveled. Opening of the car door, through the safety device circuit precludes any landing button or even push button on the car control from operating the car. Should the passenger be slow in opening the car door, someone at another landing may push a landing button and effect starting of the car 3 away from the landing to which it has taken the passenger.

The landing push button control may be considered, say as for taking the car from the second floor to the fourth floor. The one desiring passage in the elevator pushes button 182 at the fourth floor. From the terminal 156 at the throw over switch 22, and the line 157 extends line 183 through the closed time lag interlock or switch 180 at the direction switch torque motor shaft 56, thence by line 184 to the switch or push button 182 at the fourth landing. From this push button 182, this line 184 is connected to line 185 extending to terminal 186, which, in this push button control position of the throw over switch 22, is connected with terminal 187 from which extends line 188 to coil 189 at fourth floor landing relay switch 190. From this coil 189 extends line 191 which cannot get through open stop switch 192 but can get through closed stop switch 193 to the line 38 through the interlock closed by the down direction relay switch 39 and by the line 40 to energize the coil 41 in throwing the up direction switch 42, the line 43 being from the coil 41 through the safety devices for completing the circuit. The direction switch torque motor 49 is operated to close the up direction switch 58, and as before described, the high speed motor 89 is simultaneously closed, notwithstanding the interlock 152 is opened by the operation of the relay 190, as this switch 190 by-passes such relay and the push button 182. The cutting in of the high speed switch torque motor 89 is by way of slow down switch 194 at the control drum 133. The sequence of operations in stopping is as heretofore described: The roller 126, riding on the cam end 114 of the drum 133, opens the slow down switch 194 to cut out the high speed windings and actuate the car 3 toward the fourth floor at low speed, and as the car reaches such landing, the roller 126 for the stop switch 193 is operated by riding on the cam to open this stop switch 193. Automatically the elevator car 3 is brought to the fourth floor, where the one contemplating use of the car may open the landing gate promptly before the time lag switch 180 has closed, and thereby gain control of the car by selecting a floor by depressing a push button in the car panel 157 as soon as the car gate is closed.

The push button control of the direction torque motor 49 and of the high speed switch torque motor 89 in starting is to the exclusion of the low speed switch torque motor 64. This is effected by bringing from the line 24, line 195, through the interlock 60, closed before operation of the high speed switch motor 89, thereby connecting the lines 59, 20, 53, in circuit to energize the motor 49. As the motor 89 operates, the interlock 60 opens this circuit from the line 195, but for up direction, interlock 196, and for down direction interlock 197 are operated from the direction switch shaft 56 to connect the line 195 to the lines 20, 53.

As the switch 134 in the car 3 is actuated to change the car operation from manual to automatic, the throw over switch 22 cuts out the annunciators in the car 3 which disclosed to the car operator at which landing a signal button was pushed. The regular landing push buttons are effective for the annunciator. Transformer 198 reduces the annunciator circuit voltage from the supply lines 31, 44, which circuit is closed as the throw over switch 22 cuts in for manual operation and connects terminal 199 with terminal 156. Simultaneously the lines from the respective landings, as terminal 186, are connected, as to the terminal 200. Annunciator panel 201 in the car 3 is thus connected up for receiving the push button signals and disclosing such to the car operator.

The drum 5′, mounted on the shaft 6′ in the upper portion of the elevator shaft or well 1, is connected up to be actuated so that its surface or peripheral speed equals the lineal speed of the car 3. Accordingly, the surface speed of this driven drum 5′ is similar to the surface speed of the hoisting drum 5. This provision of a separate drum permits retention of accuracy of control which might be disturbed by stretching of the hoisting cable even were such anchored to the hoisting drum, instead of the traction type. The traction type might have additional cause for repeated adjustments, owing to slippage.

Anchor 202 at the elevator car 3 (Fig. 1) permits attachment of line 203 as a running control line extending upward about the driven drum 5′, thence toward the bottom of the well 1 to pass about tension idler pulley 204, and then upward to anchor 205 on the car 3. Weight 206 loads the pulley 204 and tends to keep this control line 203 from slacking and in proper contact with the drum 5′. This auxiliary drive for the control is accordingly one which is not disturbed by various loadings of the car 3, and one which does not require very much adjustment to keep in condition for controlling the travel of the elevator car 3 for accurate stopping in the shaft 1. For instance, in car travel at 150 ft. per minute, with slow down to 25 ft. per minute, the automatic stopping herein occurs within 1/8 inch of the landing. There is no lost motion of intermediate connections to detract from niceties of adjustment. This means close landing registering for freight service, as in loading and unloading trucks, while for passenger service the registry insures against any stub toe accidents.

What I claim is:

1. An electric elevator installation embodying a car, a control line from the car, a drum driven by the line, actuating means for the car independent of said control line and driven drum, and a controller for the actuating means including means angularly rotative with said drum during normal travel of said car.

2. A hoisting drum, a load connected to said drum, and control means for said drum, said control means including a driven drum, and actuating means from the load for causing said driven drum to rotate in predetermined relation to the travel of said load.

3. A hoisting drum, a load connected thereto, control means including a driven drum, and a line tied to said load and said driven drum respectively for rotating the latter during all travel of the load.

4. A hoisting drum, a load connected thereto, control means including a driven drum, and a line tied to said load and said driven drum respectively for causing the latter to rotate with substantially the same linear surface speed as the rate of travel of the load.

5. A hoisting drum, a load connected thereto, a control switch to control the stopping of the load at a predetermined point, control means for said switch including a driven drum, and a line directly connecting the load to said driven drum to effect an opening of said switch at approximately the same speed as that at which the load travels.

6. A driven drum, axially shiftable control means rotating with said drum during normal rotation of said drum, a fixed support, and a control means actuated device anchored with the support eccentric to the axially shiftable control means to be actuated thereby.

7. A hoisting drum, a load therefor, a driven drum, a rotatable control member actuatable from the driven drum, and driving connections between the load and driven drum operable to maintain similar linear travel rate for the surface of said driven drum and for the load during all travel of said load.

8. A driven drum, an axially shiftable rotatable coaxial control member, a fixed support about said control member, and a control member actuated device anchored with the support eccentric to the control member.

9. A driven drum, a control member, connections from the driven drum to rotate the control member therewith during all travel of the driven drum, and means for shifting the control member axially of the driven drum.

10. A driven drum, a control member, connections from the driven drum to rotate the control member therewith during all travel of the driven drum, and means for guiding the control member toward and away from the driven drum.

11. A driven drum, a control member, connections from the driven drum to rotate the control member therewith, rotatable guide means for the control member, threaded means effecting axial travel of the control member, a fixed support about the control member, and a device anchored with the support eccentric to the control member, said device being located so as to be acted upon by said control member.

12. An axially shiftable rotatable control member, a fixed support, switch means anchored to the support eccentric to the control member and directly actuatable by said control member.

13. An axially shiftable rotatable control member, fixed supporting means embracing said control member, and two series of switches anchored to the supporting means, eccentric to the control member and oppositely disposed as to the control member.

14. An axially shiftable rotatable control member, supporting means having arcuate portions adjacent the control member, and means for anchoring said switches to said arcuate portions.

15. An axially shiftable rotatable control member, supporting means having arcuate portions adjacent the control member, and means for adjustably mounting switches on said arcuate portions.

16. An axially rotatable control member, two series of switches, and angularly adjustable mounting means for the switches.

17. An elevator car, a hoisting drum for the car, a driven drum, an axially shiftable control member coaxial with the driven drum, two series of switches, one for travel of the car in one direction and the other for travel of the car in the opposite direction, and control means in the car for determining the control of the switch operation by said control member.

18. An elevator car, a hoisting drum therefor, a control member, two oppositely extending series of switches, one for direction of the car travel upwardly and the other for the direction of the car travel downwardly, and control means in the car for predetermined control of the switch operation through said control member.

19. An elevator car, a hoisting drum therefor, a control member, two oppositely extending series of switches, one for one direction of car travel and the other for the opposite direction of car travel, and a cut-out in the car for said control member.

20. An elevator car, a control therefor, a manually directed controller in the car shiftable into off position for effecting stopping of the car, a preselective landing control for the car including landing switches, and a throw over control operable from the car for cutting out the manually directed controller and cutting in said preselective landing control or vice versa.

21. An elevator car, a control therefor, a manually directed controller in the car shiftable into off position for effecting stopping of the car, a preselective landing control for the car including landing switches, and a throw over control located outside of the car but operable from the car for cutting out the manually directed controller and cutting in said preselective landing control or vice versa.

22. An elevator car, a control therefor, a manually directed controller in the car shiftable into off position for effecting stopping of the car, a preselective landing control for the car including landing switches, a throw over control operable by electric current for cutting out the manually directed controller and cutting in said preselective landing control or vice versa, and manually operable means for controlling the electric current to operate said throw over control.

23. An elevator car, a control therefor, a manually directed controller in the car shiftable into off position for effecting stopping of the car, a preselective landing control for the car including landing switches, a throw over control, electromagnetic means operable to actuate the throw over control to cut out the manually directed controller in the car and to cut in said preselective landing control or vice versa, and manually operable means for controlling the operation of said electromagnetic means.

24. An elevator car, a control therefor, a manually directed controller in the car shiftable into off position for effecting stopping of the car, a preselective landing control for the car including landing switches, a throw over control operable to cut out the controller in the car and to cut in said preselective landing control or vice versa, a torque motor for operating said throw over control and manually operable means within the car for controlling the operation of said torque motor.

25. An elevator car, a control therefor, a manually directed controller in the car shiftable into off position for effecting stopping of the car, a preselective landing control for the car including landing switches, a throw over control operable to cut out the manually directed controller in the car and to cut in said preselective landing control or vice versa, a reversible torque motor operable when energized in one direction to shift the throw over control for automatic operation and operable when energized in the opposite direction to shift the throw over control back for manual direction of the car, and manually operable means within the car for controlling the operation of said torque motor.

26. An elevator car, a control therefor, a manually directed controller in the car shiftable into off position for effecting stopping of the car, an annunciator in the car, a preselective landing control for the car including landing switches, and a throw over control operable from the car for cutting in the manually directed controller and cutting out the preselective control while placing said landing switches in operative connection with said annunciator.

27. An elevator car, a control therefor, a manually directed controller in the car shiftable into off position for effecting stopping of the car, an annunciator in the car, a preselective landing control for the car including landing switches, and a throw over control located outside the car but operable from the car for cutting in the manually directed controller in the car and cutting out the preselective control while placing said landing switches in operative connection with said annunciator.

28. An elevator car, a control therefor, a manually directed controller in the car shiftable into off position for effecting stopping of the car, an annunciator in the car, a preselective landing control for the car including landing switches, a throw over control operable by electric current for cutting in the manually directed controller in the car and cutting out the preselective control while placing said landing switches in operative connection with said annunciator, and manually operable means for controlling the electric current to operate said throw over control.

29. An elevator car, a control therefor, a manually directed controller in the car shiftable into off position for effecting stopping of the car, an annunciator in the car, a preselective landing control for the car including landing switches, a throw over control operable from the car for cutting in the manually directed controller and cutting out the preselective control while placing said landing switches in operative connection with said annunciator, electromagnetic means operable to actuate the throw over control, and manually operable means for controlling the operation of said electromagnetic means.

30. An elevator car, a control therefor, a manually directed controller in the car shiftable into off position for effecting stopping of the car, an annunciator in the car, a preselective landing control for the car including landing switches, a throw over control for cutting in the manually directed controller and cutting out the preselective control while placing said landing switches in operative connection with said annunciator, a torque motor for operating said throw over control, and manually operable means within the car for controlling the operation of said torque motor.

31. An elevator car, a control therefor, a manually directed controller in the car shiftable into off position for effecting stopping of the car, an annunciator in the car, a preselective landing control for the car including landing switches, a throw over control for cutting in the manually directed controller in the car and cutting out the preselective control while placing said landing switches in operative connection with said annunciator, a reversible torque motor operable when energized in one direction to shift the throw over control for manual operation of the car and operable when energized in the opposite direction to shift the throw over control back for automatic operation, and manually operable means within the car for controlling said torque motor.

32. In a multi-speed elevator car, low speed and high speed actuating connections for the car, in combination with a controller in the car operable through said connections to cut in first low speed and then high speed in starting the car, and in addition to said controller a preselective landing control for the car for cutting in high speed for the car in starting to the exclusion of low speed.

33. In a multi-speed elevator car, and low speed and high speed actuating connections for the car, in combination with a controller in the car operable through said connections to cut in first low speed and then higher speed in starting the car, in addition to said controller a preselective landing control for the car cutting in high speed in starting the car to the exclusion of low speed, and connections for cutting in low speed in stopping as brought about by said preselective landing control.

34. In a multi-speed elevator car, and low speed and high speed actuating connections for the car, the combination of a pre-selective landing control embodying connections effective for starting the car on high and stopping the car on low speed.

35. An elevator car, a well for the car providing landings, actuated connections for the car including a switch and rotary means for opening and closing said switch, a preselective landing control embodying manually operable connections in the car and for a landing for starting and stopping the car by operating said switch, and a mechanical retarder lagging the operation of said switch from a landing connection only, said retarder being by-passed by said car connections, but as operable from a landing connection effective in permitting a passenger in the car a timed interval at a landing before a reselection of a manual connection at a landing may be effective for operating the car.

36. An elevator car, a well for the car providing landings, actuating connections for the car including a switch and rotary means for opening and closing said switch, a preselective landing control embodying manually operable connections in the car and for the landings for starting and stopping the car by operating said switch, a mechanical retarder by-passed by said car connections and effective through control from said landing connections for lagging the operation of said switch in permitting a passenger in the car a timed interval after reaching a landing, a door at a landing, and a safety circuit operable by the opened door to render reselection of a manual connection ineffective.

37. A driven drum, a control member, connections from the driven drum to rotate the control member therewith during all travel of the driven drum, an electric circuit having terminals adjacent said control member, a switch supported independently of the control member, and means for guiding the control member during its rotation, toward and away from the driven drum and into position to actuate said switch to connect said terminals.

38. A driven drum, a control member, connections from the driven drum to rotate the control member therewith, rotatable guide means for the control member, threaded means effecting axial travel of the control member, and a switch anchored on the support outside of the control member, said switch being mounted so as to be moved into closed position by the control member, when said control member has travelled a predetermined distance.

39. An axially shiftable rotatable control member, a fixed support, an electric circuit having terminals on said support, and switch means anchored to the support outside of the control member in position to be actuated by said control member to connect said terminals.

40. An axially shiftable rotatable control member, fixed supporting means embracing said control member, two electric circuits having terminals on said supporting means, and two switches anchored to the supporting means outside of the control member in position to be actuated at different times by said control member to connect the terminals of the respective circuits.

41. An axially shiftable rotatable control member, supporting means having an arcuate portion adjacent the control member, an electric circuit having terminals on said supporting means, a switch, and means for anchoring said switch on said arcuate portion in position to be actuated by said control member to connect said terminals.

42. An axially shiftable rotatable control member, supporting means having an arcuate portion adjacent the control member, an electric circuit having terminals on said supporting means, a switch, and means for adjustably mounting said switch in different positions circumferentially of said arcuate portion and in position to be actuated by said control member to connect said terminals.

In testimony whereof I have hereunto signed my name to this specification.

ERNEST B. THURSTON.